Sept. 25, 1928.

H. H. DODGE 1,685,275

CONTROL VALVE FOR GASEOUS FUEL BURNERS

Filed Feb. 25, 1926

INVENTOR
Harry H. Dodge
BY
E. F. Murdock
ATTORNEY

Patented Sept. 25, 1928.

1,685,275

UNITED STATES PATENT OFFICE.

HARRY H. DODGE, OF GREEN ISLAND, NEW YORK.

CONTROL VALVE FOR GASEOUS-FUEL BURNERS.

Application filed February 25, 1926. Serial No. 90,698.

My invention relates in general to gaseous fuel burners and more particularly to valves for controlling the supply of fuel to such burners.

In my prior Patent, 1,529,015, patented March 10, 1925, I have disclosed a valve for use with burners employing a plurality of gaseous fuel elements, so constructed that a constant proportional flow of fuel is maintained therethrough during manipulation of the valve and in all open positions thereof. It is the primary object of my present invention to provide a valve of a somewhat similar character to that disclosed in the above mentioned patent but one which is a decided improvement thereon.

In a device constructed in accordance with the teachings of my prior patent, it is possible only to control and adjust the volume of the fuel, the proportions between the fuel ingredients remaining constant and unchangeable. In the device of my present invention, I may adjust not only the volume of the fuel but also the proportions between the ingredients thereof.

My invention will be more clearly understood from the following description taken in connection with the accompanying drawings, in which.

Figure 1:
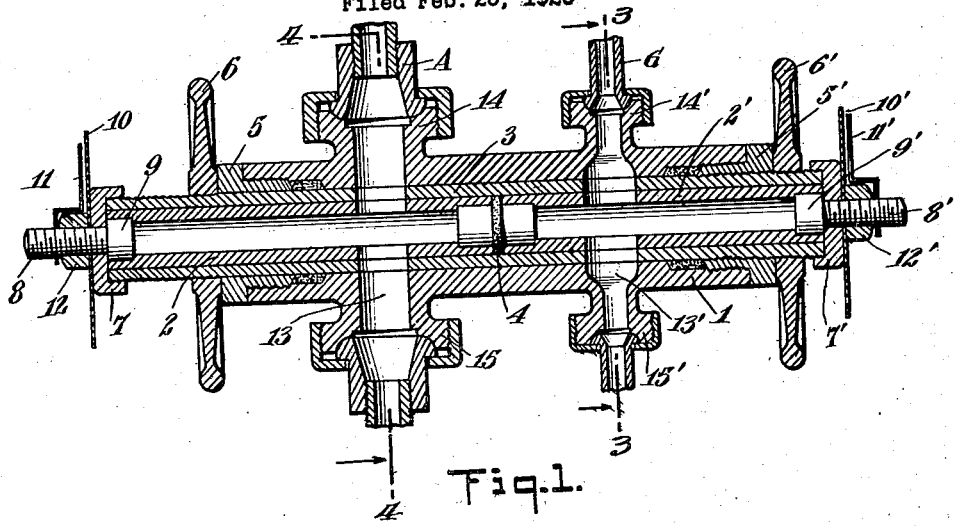
Figure 1 is a sectional view of a valve constructed in accordance with my invention.
Figure 2:
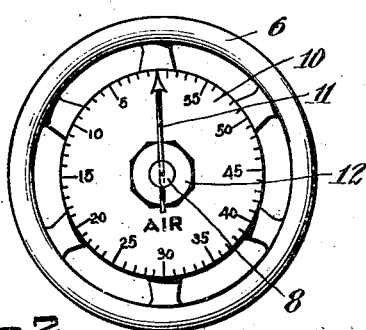
Figure 2 is a view looking from the left of Figure 1 and showing the air gage.
Figure 3:
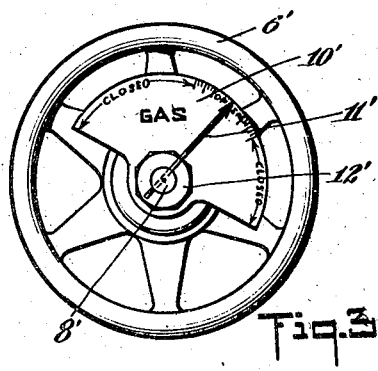
Figure 3 is a view looking from the right of Figure 1 and showing the gas gage.
Figure 4:
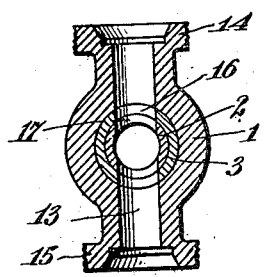
Figure 4 is a sectional view on line 4—4 of Figure 1.
Figure 5:
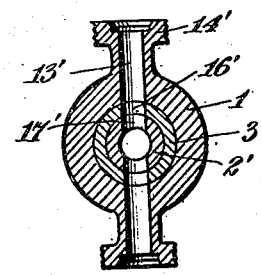
Figure 5 is a sectional view on line 3—3 of Figure 1.

The valve consists of a brass or other metal casting 1 which has a central longitudinal bore extending therethrough. Fitting within this bore are two coaxial hollow cylindrical sleeves, the inner one consisting of two parts 2 and 2′ and the outer one consisting of a single integral part 3. The two-part inner sleeve defines two chambers, one for the air, and the other for the gas, the two chambers being separated by a flexible joint generally designated by the numeral 4, which, while preventing intermixture of the gases in the different chambers, allows the two parts 2 and 2′ to rotate independent of, and relative to, one another. The sleeves project beyond each end of the casting 1 and the sleeve 3 terminates in externally threaded portions slidable through packing sleeves 5 and 5′ inserted at each end of the casting. Threaded upon the projecting ends of the sleeves 3 are hand wheels 6 and 6′. The sleeve 3 is capable of longitudinal movement only, so that, upon rotation of the hand wheels, by reason of the hand wheels bearing against packing sleeves 5, 5′, it may be moved back and forth as desired. This movement may be secured by a key in the casting engaging in a longitudinal groove in the sleeve, in a manner analogous to that disclosed in my prior patent, or it may be secured in other ways such as will readily occur to a mechanic.

Secured upon the ends of the sleeve 3 are the flanges 7, 7′, each of which is provided with an internally threaded bore for the reception of screw members 8, 8′. The screw members 8, 8′ are provided with heads 9, 9′ which fit tightly within the sleeves 2, 2′ and in interlocking engagement therewith, as shown clearly in Figure 1, so that rotation of either screw 8 or 8′ causes rotation of the respective sleeve 2 or 2′. This rotation is, of course, limited as it is accompanied by a slight longitudinal movement of sleeves 2, 2′ due to the threaded engagement of screws 8, 8′ with the flanges 9, 9′ with a concomitant depression in the flexible joint 4. It is sufficient however, for the purpose.

On the ends of the flanges 7, 7′ are placed the gages 10, 10′ provided with pointers 11, 11′, the gages being held to the flanges by means of nuts 12, 12′. The pointers are secured to the screws 8, 8′ and rotate therewith.

At suitably spaced points, the body of the casting 1 is provided with diametrically aligned lateral passages or bores 13 and 13′ and extending through connecting nipples 14, 14′ formed on the outer face of the casting. The nipple 14 is adapted for connection with the air intake A of a burner (not shown) while the other nipple 14′ is adapted for connection with the gas intake G of the burner. Similar nipples 15, 15′ are formed on the opposite side of the casting for connection with air and gas outlets.

The sleeve 3 is provided with openings 16, 16′ which align with the bores 13, 13′ respectively and the sleeves 2, 2′ are also respectively provided with similar openings 17, 17′ which align with both the bores 13, 13′, and the openings 16, 16′. The bore 13 and openings 16 and 17 are adapted for the passage of air therethrough, and the bore 13′ and openings 16′ and 17′ are adapted for the passage of gas therethrough. Rotating of the hand wheels 6, 6' causes longitudinal movement of the sleeve 3 and consequent constriction of openings 16, 16' with the result that the volume of the fuel delivered is diminished. Rotating of either screw 8 or 8' causes rotation of sleeves 2 or 2' respectively and consequent constriction of openings 17, 17'. Inasmuch as screws 8 and 8' may be rotated independently it is obvious that the quality of the fuel may be varied at will. The gages 10 and 10' indicate the degree of rotation of the sleeves 2, 2' and therefore serve as a convenient means for determining the quality of the fuel, it being understood that they are calibrated in any suitable manner.

While I have described a specific embodiment of my invention, I desire it to be understood that I do not limit myself to the precise details, as various modifications will readily occur to those skilled in this art.

What I claim is

1. In a valve of the class described, a valve body provided with a longitudinal bore and a plurality of transverse gas passages extending through said body, a non-rotatable member within said bore provided with openings adapted to align with gas passages, means for moving said member longitudinally, another member within the bore and provided with openings adapted to align with the gas passages in the body and the openings in the first member, said second member being divided into two parts, means for preventing passage of gas between the parts, and means for independently rotating each part of said second member.

2. In a valve for gas burners, a valve body provided with a longitudinal bore, a plurality of transverse gas passages extending therethrough, a sleeve within said bore provided with openings adapted to align with the gas passages, said sleeve being divided into two parts separated by a gas-tight flexible joint and means for independently rotating each part of the sleeve.

3. In a valve for fuel burners, a valve body provided with a longitudinal bore, a plurality of transverse gas passages extending through of said body, a non-rotatable sleeve within said bore provided with openings adapted to align with said gas passages, means for moving said sleeve longitudinally, another sleeve within said first sleeve and provided with openings adapted to align with the gas passages in the body and the openings in the first sleeve, said second sleeve being divided into two parts separated by a gas-tight flexible joint, and means for independently rotating each part of the last-mentioned sleeve.

In testimony whereof, I have signed by name to this specification this 23rd day of February, 1926.

HARRY H. DODGE.